(12) United States Patent
Petrarca et al.

(10) Patent No.: US 8,561,637 B2
(45) Date of Patent: Oct. 22, 2013

(54) VENT VALVE

(75) Inventors: Joseph Petrarca, Sparta, NJ (US); Chris Lynch, Landing, NJ (US); Tim Girard, Vero Beach, FL (US); Michael Fernandez, Keansburg, NJ (US)

(73) Assignee: Girard Equipment, Inc., Manalapan, NJ (US)

( * ) Notice: Subject to any disclaimer, the term of this patent is extended or adjusted under 35 U.S.C. 154(b) by 361 days.

(21) Appl. No.: 12/877,561

(22) Filed: Sep. 8, 2010

(65) Prior Publication Data
US 2011/0056938 A1    Mar. 10, 2011

Related U.S. Application Data

(60) Provisional application No. 61/240,464, filed on Sep. 8, 2009.

(51) Int. Cl.
*F16K 17/26* (2006.01)
*F16K 24/00* (2006.01)

(52) U.S. Cl.
USPC ............... 137/493.5; 137/493.4; 137/493.6; 137/493.9

(58) Field of Classification Search
USPC ............ 137/493.5, 493.6, 493.4, 493.9, 522, 137/523, 72, 495, 493.3; 251/82, 83, 323, 251/335.2; 220/203.04, 203.01, 203.29, 220/203, 203.27, 203.23, 203.19, 1.6, 1.5
See application file for complete search history.

(56) References Cited

U.S. PATENT DOCUMENTS

| 1,093,576 A | | 4/1914 | McNutt |
| 1,973,258 A | * | 9/1934 | Jensen ..................... 220/203.26 |
| 3,604,450 A | * | 9/1971 | Botkin ........................ 137/493.4 |
| 5,165,445 A | * | 11/1992 | Vertanen ..................... 137/493.6 |
| 7,275,651 B2 | * | 10/2007 | Morales et al. ........... 220/203.23 |

FOREIGN PATENT DOCUMENTS

GB    1433441 A    4/1976
GB    2 175 372 A    11/1986

OTHER PUBLICATIONS

International Search Report, dated Nov. 24, 2010, issued in corresponding International Application No. PCT/US2010/048099.

* cited by examiner

*Primary Examiner* — Stephen M Hepperle
*Assistant Examiner* — Michael R Reid
(74) *Attorney, Agent, or Firm* — Saul Ewing LLP

(57) ABSTRACT

A valve includes a housing configured to interengage with a container, a first and second poppets axially movable between open and closed positions, a first seal between the first poppet and the housing, a second seal between the first poppet and the second poppet, and first and second resilient members disposed within the housing and urging the first and second poppets toward the closed position.

22 Claims, 6 Drawing Sheets

Neutral Position

Neutral Position

Pressure Relief

VENT VALVE

CROSS REFERENCE TO RELATED APPLICATION

This application claims priority to U.S. Provisional Application No. 61/240,464, filed Sep. 8, 2009, all of which are hereby incorporated by reference.

FIELD OF INVENTION

The present invention relates generally to a pressure differential relief valve, and, more specifically, to a pressure/vacuum relief valve for intermediate bulk containers.

BACKGROUND OF INVENTION

Intermediate bulk containers (IBC) are ubiquitous in industry. An IBC is a standardized container used for transport and storage of fluids and bulk materials. The construction of an IBC varies depending on the application. For example, there are foldable (collapsible) IBCs, plastic composite IBCs, steel IBCs, and stainless steel IBCs. IBCs offer a number of advantages. For example, they are generally cubic in form and therefore can transport more material in the same area than cylindrically-shaped containers, such as drums, or consumer-sized packages. Additionally, a manufacturer of a product can bulk package the product in an IBC in one location, ship it at a reasonably low cost to another location, and then repackage the product in its final consumer form in accordance with local regulations in a form and language suitable for that location. Furthermore, because IBCs are standardized, over the years, systems have been developed, world-wide, for filling and discharging them.

Typically, an IBC has two valves. One valve is a fuseable type valve, which is used to avoid catastrophic internal pressure. Specifically, fuseable valves are designed to irreversibly pop open when the pressure inside the container exceeds a certain point to prevent the container's explosion. Such fuseable valves are designed primarily for situations involving excessive heat, for example, fire. Typically, the pressure differential needed to pop these valves is between 2 and 10 psig. It is important to note that fuseable valves are irreversible, meaning that, once they pop, they cannot be reused and need to be replaced.

The other valve is a pressure/vacuum relief valve for pressure differentials that occur between the container pressure and ambient under ordinary conditions—e.g., ordinary temperature fluctuation throughout the day. One common pressure valve is the GITS valve commercially available through GITS Manufacturing, Creston, Iowa. This valve has become essentially a defacto standard in the industry and serves to both pressure vent and vacuum vent.

Despite the ubiquitous use of the GITS valve in IBC applications, Applicants have identified a number of problems associated with the GITS valve. For example, it tends to leak in its closed state, causing unintentional discharge of the contained material. This can be particularly problematic if the contained material is caustic or otherwise environmentally hazardous. Additionally, GITS valves tend to be unreliable, and the pressure differential at which the valve is supposed to vent tends to vary over the life of the valve and among different valves. In general, the valve's venting performance is not reliable. Furthermore, the GITS valve is susceptible to damage and is not regarded as being sufficiently rugged for industrial environments.

Therefore, a valve having improved reliably and ruggedness is needed. The present invention fulfills this need among others.

SUMMARY OF INVENTION

One aspect of the invention is a valve for pressure regulating a container to which it is attached. In one embodiment, the valve comprises: (a) a housing configured to interengage with a container, and having at least one axis and at least one aperture; (b) a first poppet axially movably within said housing between a first closed position and a first open position; (c) a second poppet axially movable within said first poppet between a second closed position and a second open position; (d) a first seal between said first poppet and said housing; (e) a second seal between said first poppet and said second poppet; (f) a first resilient member disposed within a first space between said housing and said first poppet, and having a resilient force sufficient to hold said first poppet in said first closed position such that said first poppet urges said first seal against said housing when a pressure differential axially across said first poppet is below a first point, and to allow said first poppet to move in said first direction to said first open position when said fluid pressure differential exceeds said first point; and (g) a second resilient member disposed within a second space between said first poppet and said second poppet, and having a resilient force sufficient to hold said second poppet in said closed position such that said second poppet urges said second seal against said first poppet when a pressure differential axially across said second poppet is below a second point, and to allow said second poppet to move in a second direction, different from said first direction, to said second open position when said pressure differential exceeds said second point.

Another aspect of the invention is a container assembly having the valve described above. In one embodiment, the container assembly comprises (a) a container; and (b) a valve mounted to said container, said valve comprising (i) a housing configured to interengage with a container, and having at least one axis and at least one aperture; (ii) a first poppet axially movably within said housing between a first closed position and a first open position; (iii) a second poppet axially movable within said first poppet between a second closed position and a second open position; (iv) a first seal between said first poppet and said housing; (v) a second seal between said first poppet and said second poppet; (vi) a first resilient member disposed within a first space between said housing and said first poppet, and having a resilient force sufficient to hold said first poppet in said first closed position such that said first poppet urges said first seal against said housing when a pressure differential axially across said first poppet is below a first point, and to allow said first poppet to move in said first direction to said first open position when said fluid pressure differential exceeds said first point; and (vii) a second resilient member disposed within a second space between said first poppet and said second poppet, and having a resilient force sufficient to hold said second poppet in said closed position such that that said second poppet urges said second seal against said first poppet when a pressure differential axially across said second poppet is below a second point, and to allow said second poppet to move in a second direction, different from said first direction, to said second open position when said pressure differential exceeds said second point.

DETAILED DESCRIPTION

Figure 6:
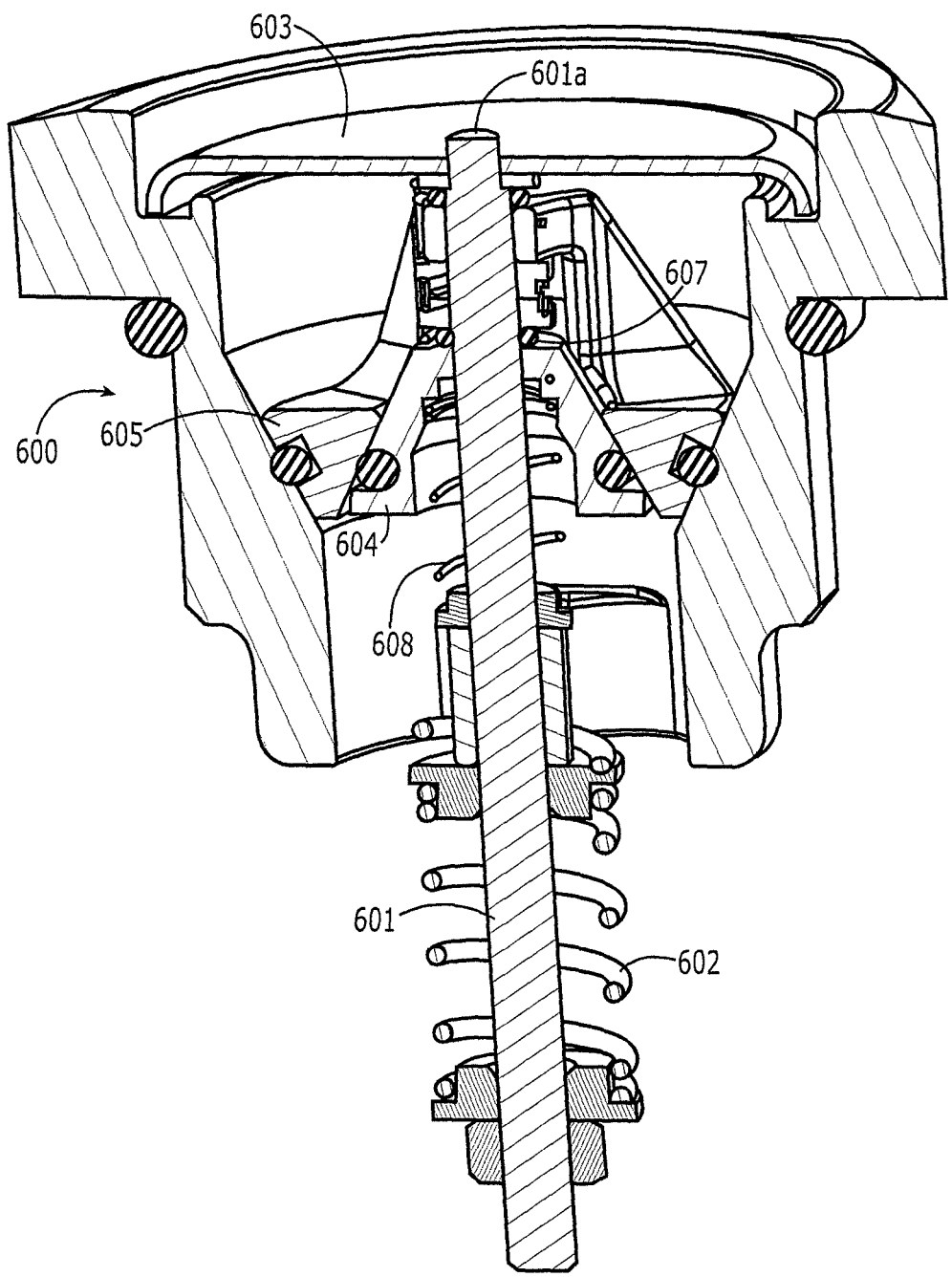
FIG. 6 shows a perspective view of the prior art GITS valve

Among other aspects, the present invention involves Applicants' identification of problems and their sources in the conventional GITS valve 600 as shown in FIG. 6. Specifically, Applicants have identified that the valves' susceptibility to leaking is caused, at least in part, by a common post 601 that runs along its axis, through both the vacuum vent poppet 604 and the pressure vent poppet 605, and through the rain cover 603. (The end of post 601a can be seen protruding from the rain cover 603). Sealing around this post requires a plurality of O-rings (e.g., ring 607), which, aside from adding complexity to the valve 600, tend not to seal well around the narrow post 601. Consequently, this common post 601 serves as a conduit for fluids to escape from the interior of the container to atmosphere.

Applicants have also identified that reliability issues stem, at least in part, from a configuration of opposing springs about the common post. Specifically, the vacuum and pressure poppets have springs that are situated about the common post and in opposition with one another, i.e., the pressure poppet spring 602 and the vacuum poppet spring 608 can be seen in FIG. 6.) Accordingly, the expansion/compression of one spring results in the opposite movement of the other spring. This introduces instability into the system and results in a relatively loose tolerance in the pressure differentials that cause vacuum/pressure venting of the container. Likewise, the opposing springs make it difficult to adjust the settings of the pressure and vacuum release points.

Furthermore, Applicants identified that the spring 602 is susceptible to fouling by the material stored in the container. Specifically, the above-mentioned springs are exposed in the lower part of the valve—the part that is disposed in the container during use. Accordingly, the springs are often in contact with the material stored in the container. If this material is viscous, has coating properties, or is caustic, it may have a detrimental affect on the springs, especially over time.

Furthermore, Applicants have identified that the protrusion of the rain cover 603 on the valve 600 also tends to be problematic as hoses/cables and other articles can easily snag it, causing inconvenience and often damage to the valve itself. Thus, the high profile of the valve's cover is inconvenient and diminishes its ruggedness.

In addition to identifying these problem sources, Applicants also recognize that the GITS valve does not allow for manual ventilation. In other words, for vacuum or pressure venting to occur, a certain pressure differential between atmospheric and the container must be achieved. However, often times it is desirable to neutralize completely the differential between atmospheric and container pressure when removing a valve or otherwise opening the container. Unless the pressure differential is neutralized, it is very difficult to remove fittings from the container. Therefore, Applicants have identified a need for a valve that affords manual ventilation to neutralize the pressure differential between ambient and the container.

Figure 1:
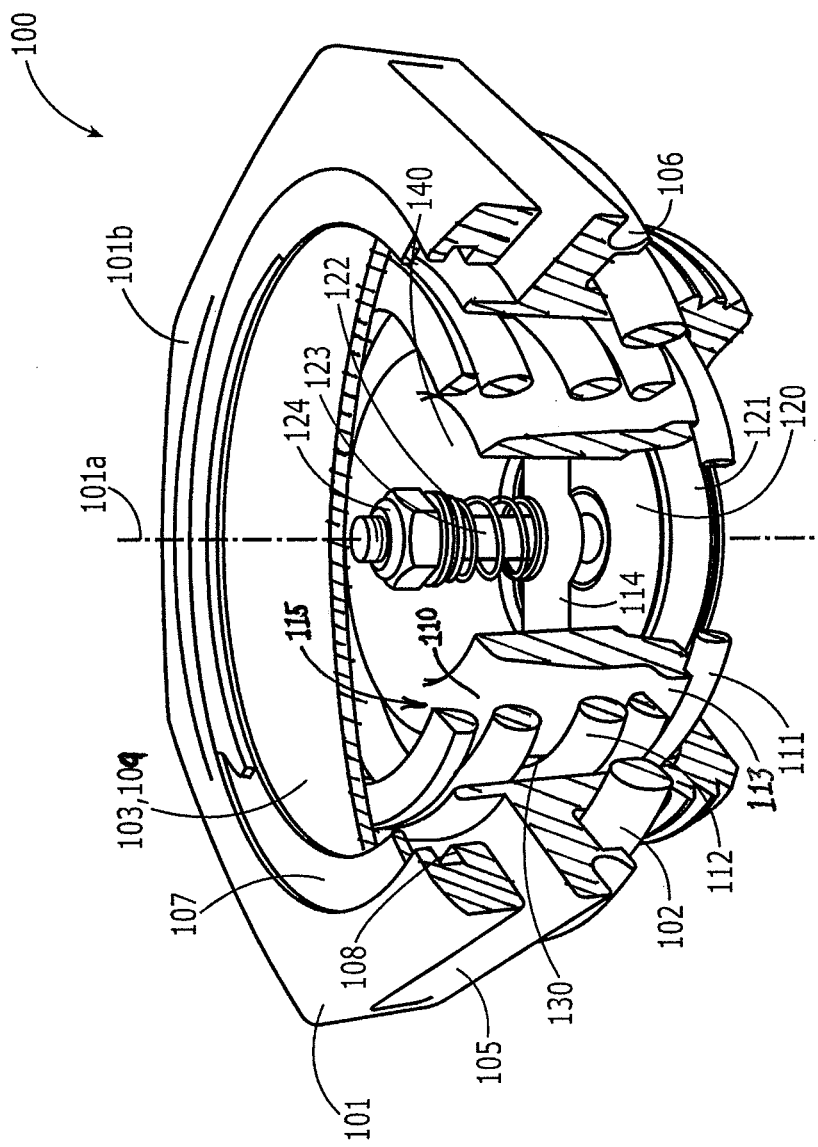
FIG. 1 shows a cutaway view of one embodiment of the valve of the present invention.
Figure 3:
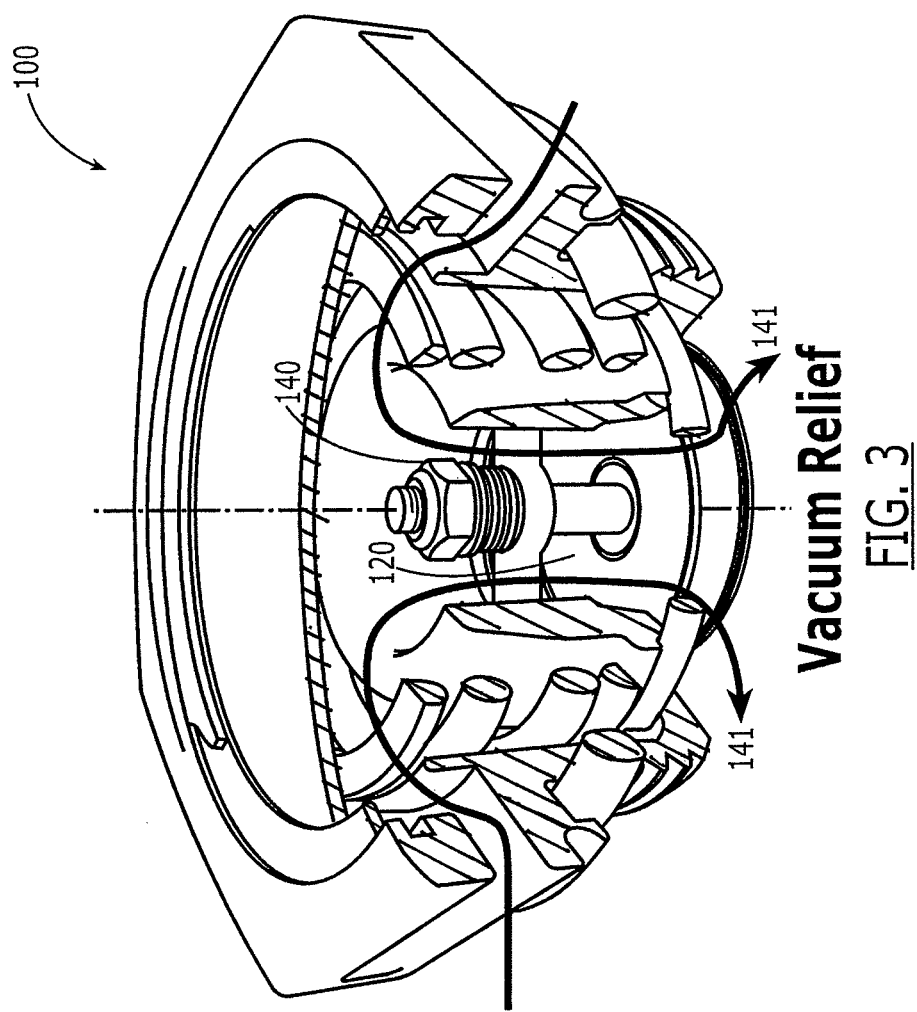
FIG. 3 shows a cutaway view of the valve of FIG. 1 in a second open position.

Applicants not only identified the shortcomings of the GITS valve, but also provided a solution. Referring to FIG. 1, one embodiment of the valve 100 of the invention is disclosed. The valve 100 comprises a housing 101 configured to interengage with a container 401 (see container 401, FIG. 4), e.g., via a threaded connection that will compress a seal 102 therebetween, and has at least one axis 101a and at least one aperture 105. The housing contains at least two poppets. Specifically, a first poppet 110 is axially movably within said housing 101 between a first closed position (see FIG. 1) and a first open position (see FIG. 3). A second poppet 120 is axially movable within said first poppet 110 between a second closed position (see FIG. 1) and a second open position (see FIG. 3). Associated with the poppets are seals. Specifically, a first seal 111 is between said first poppet 110 and said housing 101, and a second a second seal 121 is between said first poppet 110 and said second poppet 120.

The position of the poppets is controlled by their respective resilient members. Specifically, a first resilient member 112 is disposed in a space 130 between said housing 101 and said first poppet 110, and has sufficient resilient force to bias said first poppet in said first closed position such that said first poppet urges said first seal against said housing when a pressure differential axially across said valve is below a first point, and to allow said first poppet to move in said first direction to said first open position when said pressure differential exceeds said first point. A second resilient member 122 is disposed in a space 140 between said first poppet 110 and said second poppet 120, and has a resilient force sufficient to bias said second poppet in said closed position such that that said second poppet urges said second seal against said first poppet when a pressure differential axially across said second poppet is below a second point, and to allow said second poppet to move in a second direction, different from said first direction, to said second open position when said pressure differential exceeds said second point.

A connector of this configuration has one or more attributes that addresses the aforementioned problems. For example, because the second poppet is mounted within the first poppet and is essentially supported by the first poppet, the need for a central post upon which both poppets are mounted is eliminated. By eliminating the common post, the complexity and unreliability of sealing it are eliminated too. Additionally, because the poppets are not mounted to a common post, their resilient members are not opposing. Instead, their resilient members are independent of one another such that the expansion of one spring does not result in the expansion or compression of the other spring. Additionally, because the first resilient member is in the first space, and the second resilient member is in the second space, they are essentially interior to the valve. They exposed to neither the material contained within the container, nor atmospheric conditions. Therefore, the integrity and performance of the resilient member is preserved. Additionally, the poppet configuration of the valve of the present invention also facilitates manual actuation of the poppets, allowing pressure between the container's interior and ambient to be neutralized. Still other features and benefits of the valve of the present invention will be apparent in light of the following detailed description.

The first and second poppets 110, 120 function to alleviate a pressure differential between the atmosphere and the inside of the container to which the valve is mounted. For example, if the pressure in the container rises too high relative to atmospheric, the poppets move to pressure vent the container. Conversely, if the pressure in the container drops too low below atmospheric, the poppets move to vacuum vent the container. The pressure venting and vacuum venting is discussed more specifically with reference to FIGS. 2 and 3.

Figure 2:
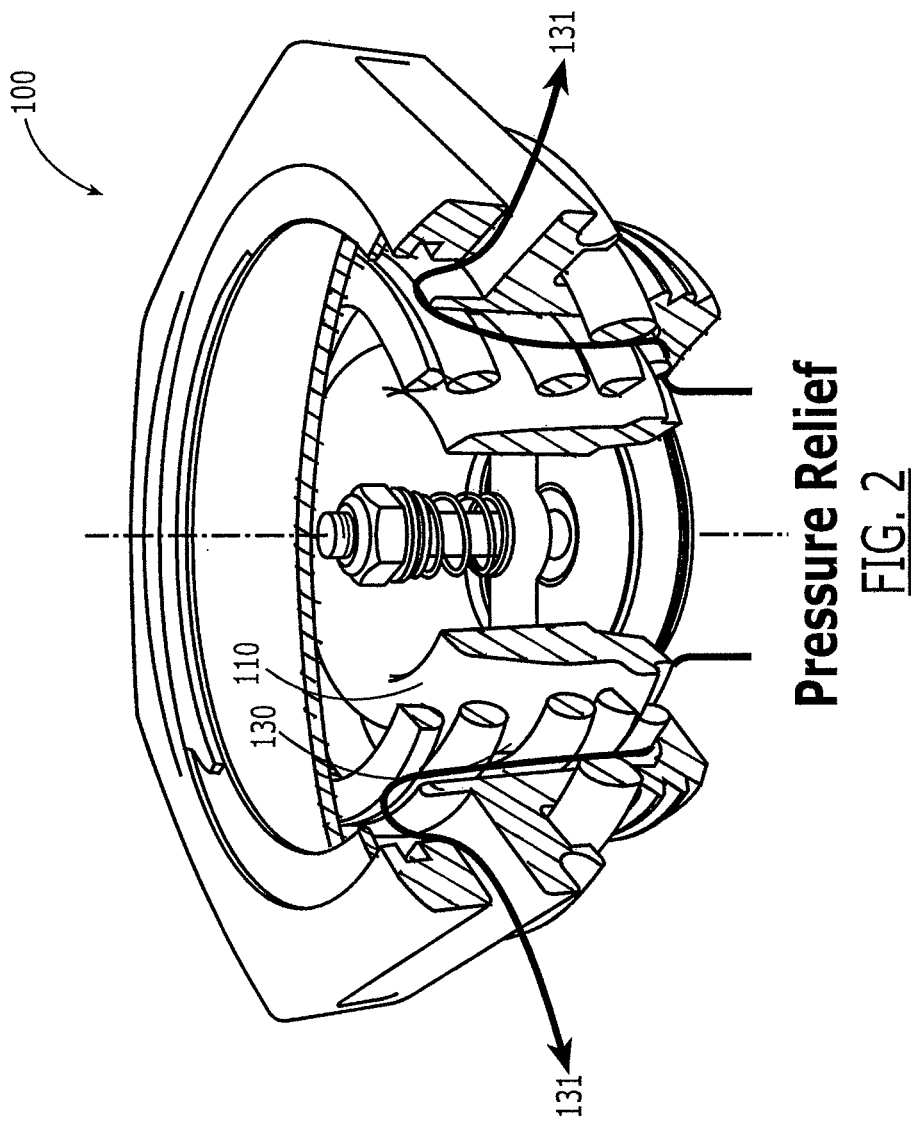
FIG. 2 shows a cutaway view of the valve of FIG. 1 in a first open position.

Referring to FIG. 2, the valve 100 is shown in a first vent state, which happens to correspond to a pressure vent state in this illustration. In such a state, the first poppet 110 is moved in a first direction from its closed position to its open position, while the second poppet 120 remains in its closed position as shown. (The first direction in this illustration happens to correspond to an upward configuration, although, in other embodiments, the first direction might be downward relative to the housing 101 if the orientation of the first and second poppets were reversed in the housing 101.) When the first poppet is in its open position, and the second poppet is in its closed position, a first vent path 131 is opened which includes first space 130. Specifically, the first vent path runs from inside the container (or below the valve presuming the valve has a top/bottom orientation), through the first space 130, through one or more apertures 105 and into the atmosphere. Depending upon the configuration of the poppets and the pressure differential, the first vent path may be a pressure vent or a vacuum vent. In this embodiment, it is a pressure vent because the first direction is up and away from the container. If, however, the orientation of the first and second poppets were reversed in the housing and the first direction were downward—toward the container, then the first vent path would be a vacuum vent path. It should be also understood too, that in one embodiment, at least one of the poppets may be manually actuated (discussed below), in which case, whether the vent path is relieving pressure or a vacuum depends on the pressure differential and not the direction of movement of a particular poppet.

Figure 4:
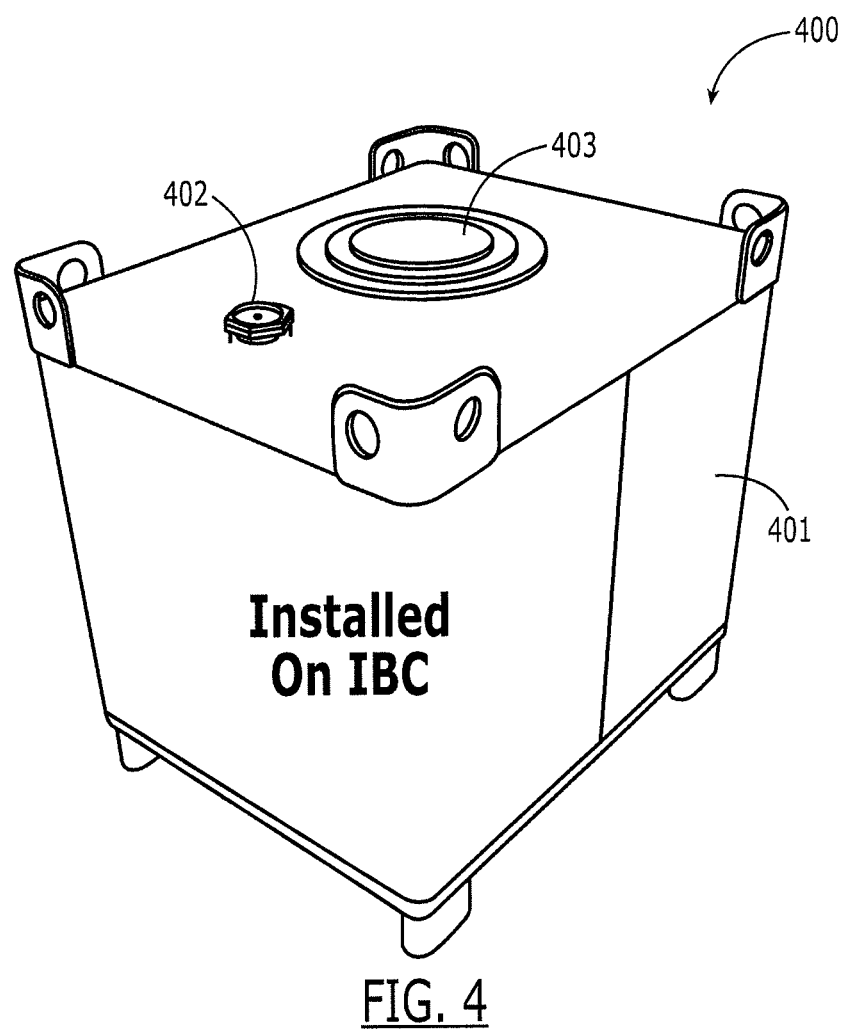
FIG. 4 shows perspective view of a container assembly including the valve of FIG.

Referring to FIG. 4, the valve 100 is shown in its second vent state. In this illustration, the second vent state happens to correspond to a vacuum vent, although, as mentioned above, it might also correspond to a pressure vent if the orientation of the poppets is reversed, or to a neutral vent if the poppets are manually actuated. In the second vent state, the second poppet 120 is moved in a second position from its closed position to an open position. The second direction in this embodiment happens to be downward, although it might be upward if the configuration of the poppets in the housing 101 were reversed as mentioned above. When the second poppet is in its open position and the first poppet in its closed position, a second vent path is opened across the valve. Specifically, the second vent path leads from atmospheric, through the apertures, through the second space 140, and into the container.

Figure 5:
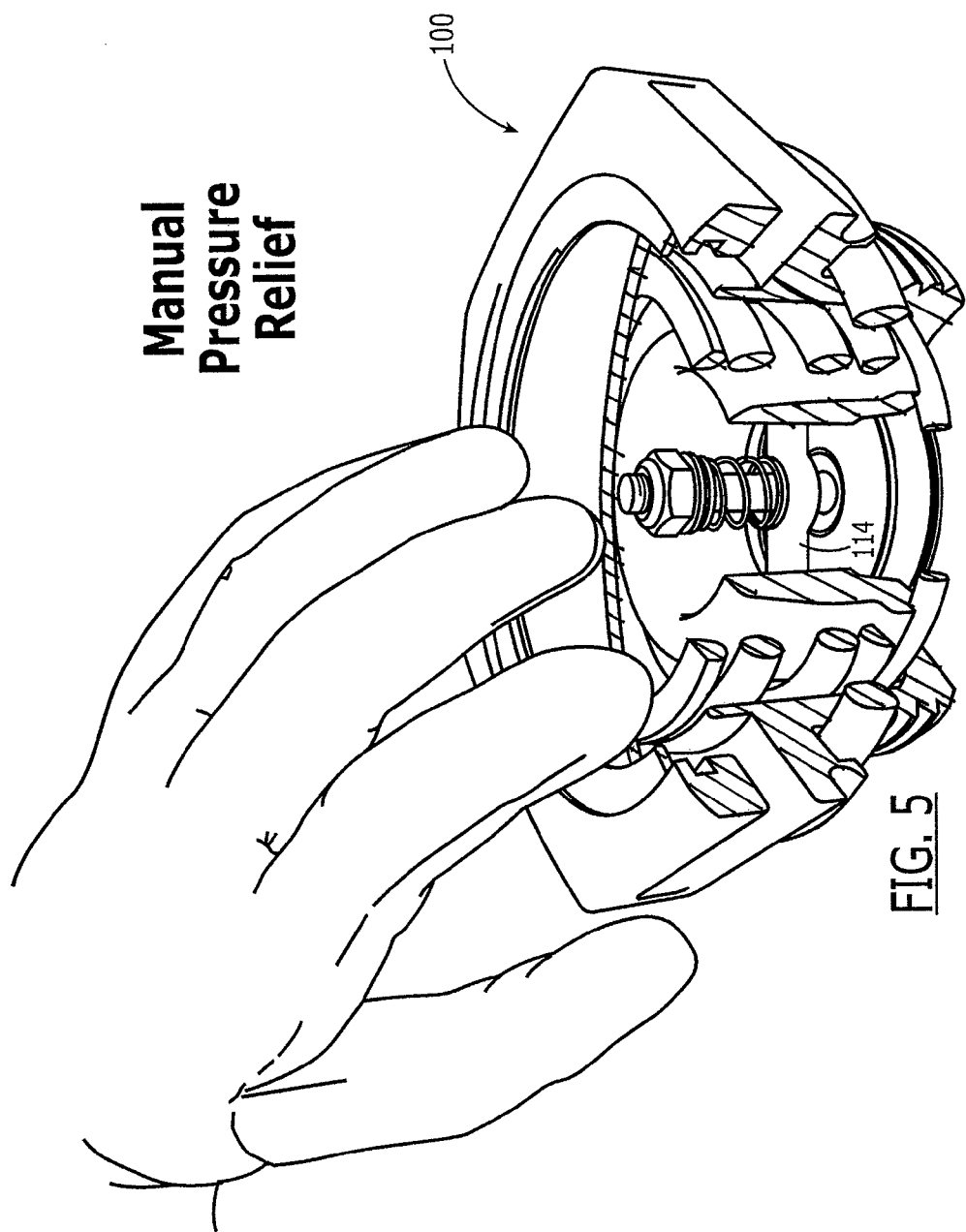
FIG. 5 shows a cutaway view of the valve of FIG. 1 in a manual open position.

In one embodiment, the valve 100 comprises an actuator to allow for manual venting regardless of the pressure differential across the valve. More specifically, the actuator is configured to move either the first or the second poppet into its open position, and thereby open the first vent path 131 or the second vent path 141. To this end, in one embodiment, the actuator 103 is configured to move axially in either the first or the second direction and either is attached to or contacts the first or second poppets such that the movement of the actuator is translated to the first or second poppet to move it from its closed position to its open position. For example, in the embodiment shown in FIG. 1, the actuator 103 is biased in the first direction with the first resilient member 112 and is manually movable in the second direction. The actuator is disposed adjacent the second poppet such that when the actuator is moved in the second direction it contacts the second poppet and moves it in the second open position as shown in FIG. 5. More specifically, as the actuator is pushed in the second direction, it contacts the post 123 extending from the second poppet. Once contact is made, further movement of the actuator 103 in the second direction causes the second poppet to move in the second direction and into its open position, thus opening the second vent path and achieving the second vent state. Although the embodiment of FIG. 1 involves the actuator 103 actuating the second poppet, it should be realized that the actuator may also be configured to move the first poppet in the first direction to achieve the first vent state. To this end, the actuator may be operatively attached to the first poppet such that movement of the actuator in the first direction moves the first poppet in the same direction to its open position. Alternatively, the orientation of the poppets within the housing 101 may be reversed such that downward movement of the actuator can be used to open the first poppet in a similar way it is used to open the second poppet as shown in the embodiment of FIG. 1.

Although the actuator may be a discrete component for actuating either the first or second poppet, in one embodiment, the actuator 103 is synergistically incorporated into the valve as a cover 109. The cover 109 functions to protect the valve from rain and other debris on the top. Accordingly, the cover 109 covers the top portion of the valve. In the embodiment of FIG. 1, the cover essentially covers the first and second spaces 130, 140. Such coverage is desirable because the first and second vent paths 131, 141 comprise these spaces, so keeping them clear of water (rain) and other debris is important.

In one embodiment, the cover 109 is disposed below the upper-most portion 101b of the housing. This way, the cover is not susceptible to snagging hoses or cables that may be pulled across the container assembly 400 (see FIG. 4).

As mentioned above, the actuator in one embodiment moves axially to effect actuation of the first or second poppets. Accordingly, if the cover 109 is used as the actuator, it should, in this embodiment, be allowed to move axially in the space above the poppets in the valve. Specifically, in the embodiment of FIG. 1, the cover 109 is essentially free floating and held resiliently in place by a resilient member, which in the embodiment of FIG. 1, happens to be the first resilient member 112 (although it could also have a dedicated resilient member). The resilient member urges the cover 109 in the first direction and against a retainer ring 107, which is disposed in an annular groove 108 in the housing 101. A user manually vents the valve by pushing the cover 109 in the first direction until it contacts the post 123 of the second poppet as described above. In this embodiment, the first poppet 110 is elongated toward the actuator 103 to provide a stop surface 115 for the actuator (FIG. 1).

The resilient members function to urge the poppets in their respective closed positions. The resilient members are sized to have a force sufficient to maintain the poppet in its closed position for a pressure differential across the poppet below a certain point. However, the resilient members have a resilient force which is low enough to allow their respective poppet to move into its respective open position when the pressure differential across it is sufficiently large—i.e., above the certain point. Sizing and optimizing resilient members for the desired resilient force is well known and will not be described herein in detail.

Suitable resilient members include, for example, springs, compliant materials such as elastomeric and foams, and pressurized members (e.g., shock absorbers). Such resilient members are well known in the art. In the embodiment shown in FIG. 1, the resilient members are coil springs. In this particular embodiment, the first resilient member functions to bias the first poppet in the second direction. The first resilient member is disposed in the first space 140. One end of the resilient member urges against a shoulder 113 of the first poppet to bias the spring in the second direction. The other end of the spring urges against the cover 109 to bias it in the first direction and urge it against the retainer 107. Therefore, the first poppet and the cover are urged away from each other by virtue of the first resilient member 112.

The second resilient member 122 biases the second poppet in the first direction. Like the first resilient member, in one embodiment, it is a coil spring as shown in FIG. 1. In this particular embodiment, a bracket 114 spans across the first poppet in the second space 140. It defines an aperture (not shown), through which the post 123 of the second poppet 120 extends. At the distal end of the post 123 is a backstop 124, which in this case is a nut on a threaded portion of the post 123. The second resilient member 122 is disposed around the post 123 between the bracket 114 and the backstop 124. The second resilient member urges the bracket 114 and the backstop 124 away from each other. Because the bracket is essentially in a fixed position, this urging force causes the backstop 124 to be biased in the first direction, thereby causing the second poppet 120 to be biased in this direction to maintain it in its closed position.

The first and second seals serve to provide a fluid-tight seal (or a near fluid-tight seal) when the first and second poppets, respectively, are in their closed positions. Seals are well known and include, for example, compliant rings, such as O-rings and gaskets, malleable metal rings, and machined surfaces. It should be understood that the seal may be a discrete part, or it may be integral with the housing, the first poppet or the second poppet. It may also be defined as an interface between the housing and the first poppet, or between the first and second poppet. For example, the first seal may be a prepared annular ring (e.g., machined surface) on the first poppet that is configured to seat in a receiving annular ring (e.g., another machined surface) on the housing. Still other seals and sealing mechanisms will be apparent to those of skill in the art in light of this disclosure. In the embodiment shown in FIG. 1, the seals are O-rings.

The housing serves to contain the various components of the valve 110 and to facilitate its attachment to a container 401 as shown in FIG. 4. More specifically, the housing 101 comprises an interface portion 106, which is configured to be received in an aperture 402 of a container 401. Such interface portions are well known and include, for example, threads or other mechanical interlocking members. Once the valve is installed on the container 401, an assembly 400 is formed. Besides the container 401 and the valve 100, the assembly 400 may also comprise a fuseable valve 403 as shown. Such fuseable valves are well known.

The housing also defines the venting apertures that are part of the first and second vent paths described above. In the embodiment of FIG. 1, a plurality of venting apertures 105 are disposed along the side perimeter of the valve. Such a configuration is advantageous in that the valve is typically mounted such that its axis 101a is upright. Accordingly, side apertures tend to be drip and rain resistant. Additionally, because they are disposed on the side, they tend not to accumulate debris, which may affect their ability to allow fluids to pass through.

As shown in FIG. 1, one embodiment the housing also comprises an annular groove 106 around its perimeter. The annular groove serves to receive a lanyard or other securing device to secure the valve to the container. This way, the valve can be removed but will still be attached to the container.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

What is claimed is:

1. A valve comprising:
   an outer housing configured to interengage with a container, and having at least one axis and at least one aperture;
   a first poppet axially movable within said outer housing between a first closed position and a first open position;
   a second poppet axially movable within said first poppet between a second closed position and a second open position;
   a first seal between said first poppet and said housing;
   a second seal between said first poppet and said second poppet;
   an actuator movably supported within said outer housing, said actuator being operable for manually moving said first or second poppet to said first open position or said second open position, respectively;
   a first resilient member abutting said actuator and disposed within a first space between said outer housing and said first poppet, and having a resilient force sufficient to hold said first poppet in said first closed position such that said first poppet urges said first seal against said outer housing when a pressure differential axially across said first poppet is below a first point, and to allow said first poppet to move in said first direction to said first open position when said pressure differential exceeds said first point; and
   a second resilient member disposed within a second space between said first poppet and said second poppet, and having a resilient force sufficient to hold said second poppet in said closed position such that said second poppet urges said second seal against said first poppet when a pressure differential axially across said second poppet is below a second point, and to allow said second poppet to move in a second direction, different from said first direction, to said second open position when said pressure differential exceeds said second point.

2. The valve of claim 1, wherein a first vent path through said valve is defined when said first poppet is in said first open position, said first vent path comprising said first space, and, a second vent path through said valve is defined when said second poppet is in said second open position, said second vent path comprising said second space.

3. The valve of claim 1, wherein, when said actuator is disposed above at least one of said first or second poppets, and is configured for axial movement relative to said housing such that when it is moved downward, it contacts said at least one of said first or second poppets and moves it into said first or second open position.

4. The valve of claim 1, wherein said actuator is biased in said first direction and is manually movable in said second direction relative to said housing, wherein said actuator is disposed adjacent said second poppet such that said movement of said actuator in said second direction contacts said second poppet and moves said second poppet to said second open position.

5. The valve of claim 1, wherein said valve has an up and down axial orientation, and wherein said actuator is a cover covering said first and second spaces.

6. The valve of claim 1, wherein said actuator is internal to the outer-most surface of said housing.

7. The valve of claim 1, wherein said first resilient member is a first spring, one end of said first spring urging operatively against said housing and another end of said first spring urging operatively against said first poppet.

8. The valve of claim 7, further comprising a cover secured by said housing, wherein said first spring urges against said cover, which, in turn, urges against said housing.

9. The valve of claim 1, wherein said second resilient member is a second spring, one end of said second spring urging operatively against said first poppet and another end of said second spring urging operatively against said second poppet.

10. The valve of claim 9, wherein said first poppet comprises a bracket having an aperture, and said second poppet comprises a post extending upwardly and through said aperture, and a backstop on said post, said second spring being disposed around said post, between said bracket and said backstop.

11. The valve of claim 1, wherein said housing comprises a threaded portion to interengage said container.

12. The valve of claim 1, wherein said housing defines an annular groove for receiving a lanyard.

13. The valve of claim 1, wherein said at least one aperture is on the side of said housing.

14. The valve of claim 13, wherein said at least one aperture is a plurality of apertures along the perimeter of said housing.

15. An container assembly comprising:
a container; and
a vent valve connected to said container, said vent valve comprising at least:
an outer housing a portion of which is interengaged with said container, and having at least one axis and at least one aperture;
a first poppet axially movable within said outer housing between a first closed position and a first open position;
a second poppet axially movable within said first poppet between a second closed position and a second open position;
a first seal between said first poppet and said housing;
a second seal between said first poppet and said second poppet;
an actuator movably supported within said outer housing, said actuator being operable for manually moving said first or second poppet to said first open position or said second open position, respectively;
a first resilient member abutting said actuator and disposed within a first space between said housing and said first poppet, and having a resilient force sufficient to hold said first poppet in said first closed position such that said first poppet urges said first seal against said housing when a pressure differential axially across said first poppet is below a first point, and to allow said first poppet to move in said first direction to said first open position when said pressure differential exceeds said first point;
a second resilient member disposed within a second space between said first poppet and said second poppet, and having a resilient force sufficient to hold said second poppet in said closed position such that said second poppet urges said second seal against said first poppet when a pressure differential axially across said second poppet is below a second point, and to allow said second poppet to move in a second direction, different from said first direction, to said second open position when said pressure differential exceeds said second point.

16. The container assembly of claim 15, wherein said container is an intermediate bulk container (IBC).

17. The container assembly of claim 15, further comprising a fuseable valve.

18. The container assembly of claim 15, wherein said actuator is a cover, said cover covering said first and second spaces.

19. A valve comprising:
a unitary housing configured to interengage with a container, and having an outer-most portion and at least one axis and at least one aperture;
a first poppet axially movable within said housing between a first closed position and a first open position;
a second poppet axially movable within said first poppet between a second closed position and a second open position;
a first seal between said first poppet and said housing;
a second seal between said first poppet and said second poppet a discrete actuator wholly positioned within said unitary housing internally to said unitary housing's outer-most portion and being movably supported relative thereto, said actuator being operable for manually moving said first or second poppet to said first open position or said second open position, respectively;
a first resilient member compressed within a first space between said actuator and said first poppet, and having a resilient force sufficient to hold said first poppet in said first closed position such that said first poppet urges said first seal against said housing when a pressure differential axially across said first poppet is below a first point, and to allow said first poppet to move in said first direction to said first open position when said pressure differential exceeds said first point; and
a second resilient member disposed within a second space between said first poppet and said second poppet, and having a resilient force sufficient to hold said second poppet in said closed position such that said second poppet urges said second seal against said first poppet when a pressure differential axially across said second poppet is below a second point, and to allow said second poppet to move in a second direction, different from said first direction, to said second open position when said pressure differential exceeds said second point.

20. The valve of claim 19, wherein said actuator is disposed above at least one of said first or second poppets, and is configured for axial movement such that when it is moved in the second direction, it contacts said second poppet and moves it into said open position, and wherein said first poppet is elongated toward said actuator to provide a stop surface, said stop surface limiting movement of the actuator in the second direction to move the second poppet into the open position.

21. The valve of claim 19, wherein said housing defines an annular annual groove, said valve further comprises a retainer ring disposed in said annular groove, said retaining ring acting to limit movement of the actuator in the first direction.

22. A valve comprising:
an outer housing configured to interengage with a container, and having at least one axis and at least one aperture;
a first poppet axially movable within said outer housing between a first closed position and a first open position;

a second poppet axially movable within said first poppet between a second closed position and a second open position;

a first seal between said first poppet and said housing;

a second seal between said first poppet and said second poppet;

an actuator supported within said outer housing to be movable between a first position internal to said housing, and a second position internal to said housing, said actuator being operable for manually moving said first or second poppet to said first open position or said second open position, respectively;

a first resilient member compressed between said actuator and said first poppet, and having a resilient force sufficient to hold said first poppet in said first closed position such that said first poppet urges said first seal against said outer housing when a pressure differential axially across said first poppet is below a first point, and to allow said first poppet to move in said first direction to said first open position when said pressure differential exceeds said first point; and a second resilient member biasing said second poppet, and having a resilient force sufficient to hold said second poppet in said closed position such that said second poppet urges said second seal against said first poppet when a pressure differential axially across said second poppet is below a second point, and to allow said second poppet to move in a second direction, different from said first direction, to said second open position when said pressure differential exceeds said second point.

* * * * *